Figure 1:
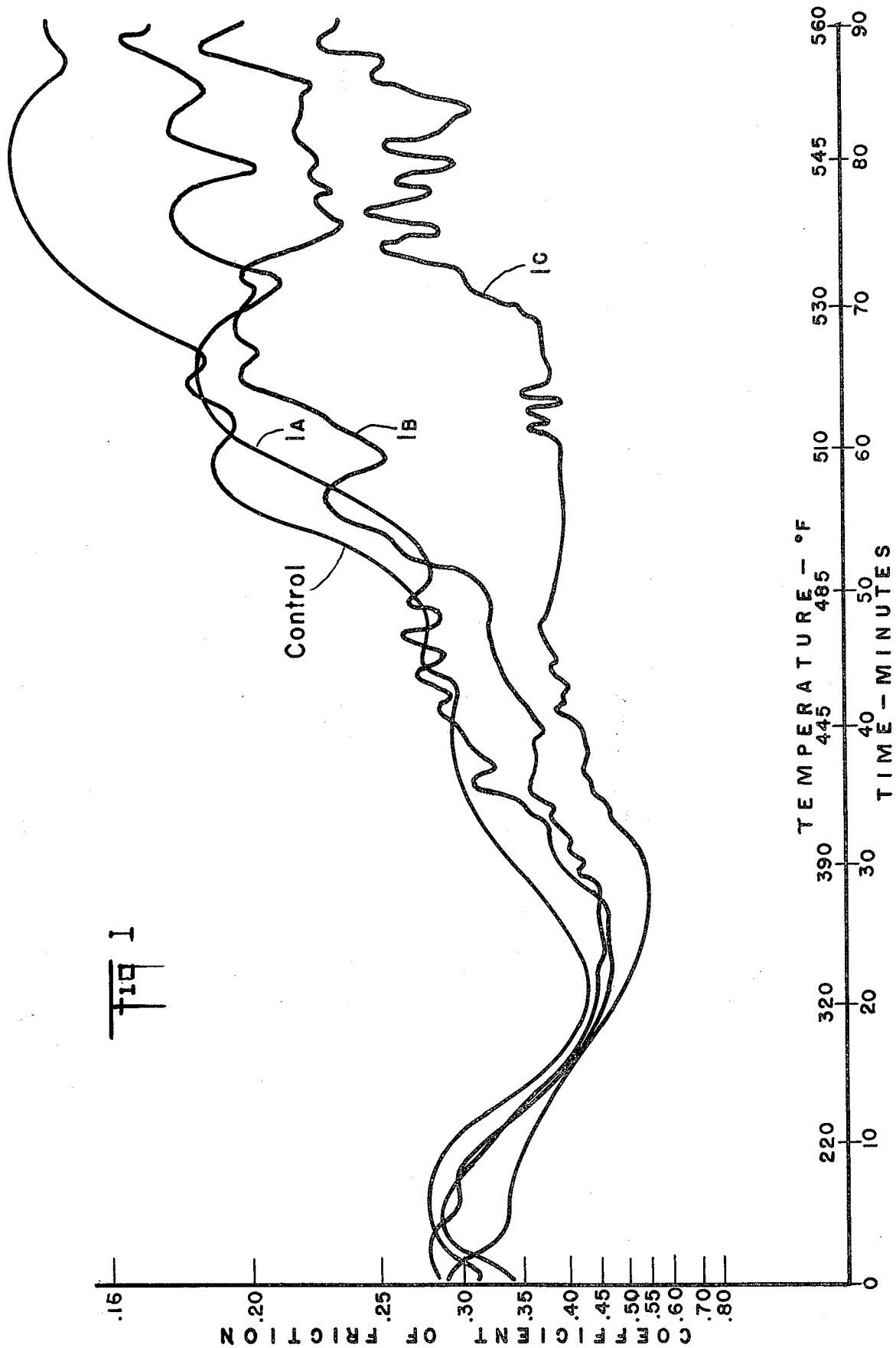

United States Patent [19]
Dougherty

[11] 3,916,062
[45] Oct. 28, 1975

[54] MOLECULAR SIEVES AS FADE INHIBITORS IN FRICTION MATERIALS

[75] Inventor: Philip H. Dougherty, Penndel, Pa.

[73] Assignee: Thiokol Corporation, Bristol, Pa.

[22] Filed: Nov. 15, 1974

[21] Appl. No.: 524,443

Related U.S. Application Data

[63] Continuation-in-part of Ser. No. 428,891, Dec. 27, 1973, which is a continuation of Ser. No. 250,502, May 5, 1972, abandoned.

[52] U.S. Cl.......... 428/320; 188/251 A; 188/251 R; 428/64; 428/224; 428/443
[51] Int. Cl.² ............................................ B32B 5/18
[58] Field of Search..... 188/251 R, 251 A; 161/160, 161/170, 42, 205

[56] References Cited
UNITED STATES PATENTS

| | | | |
|---|---|---|---|
| 3,647,744 | 3/1972 | Rich et al. | 260/38 |
| 3,723,382 | 3/1973 | Lumb | 260/38 |
| 3,730,920 | 5/1973 | D'Alessandro | 188/251 A |

OTHER PUBLICATIONS

"Mechanism of Brake Fade in Organic Brake Linings," by James M. Herring, Jr., SAE Paper No. 670146, (1967).

*Primary Examiner*—William J. Van Balen

[57] ABSTRACT

Automotive brake linings having improved fade resistance can be prepared by incorporating in conventional brake linings a small amount, preferably 1% to 15% by weight of an unloaded molecular sieve.

5 Claims, 4 Drawing Figures

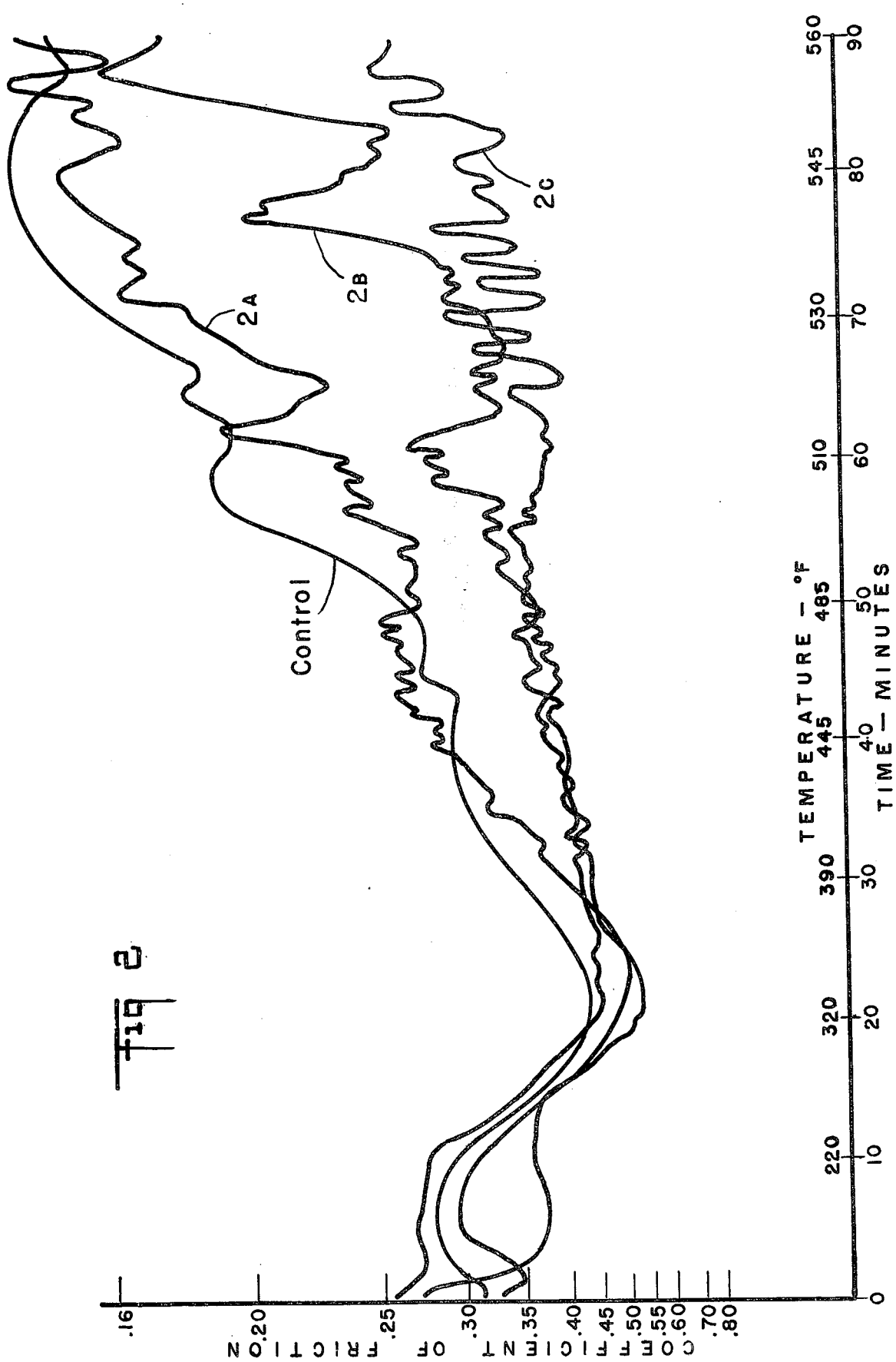

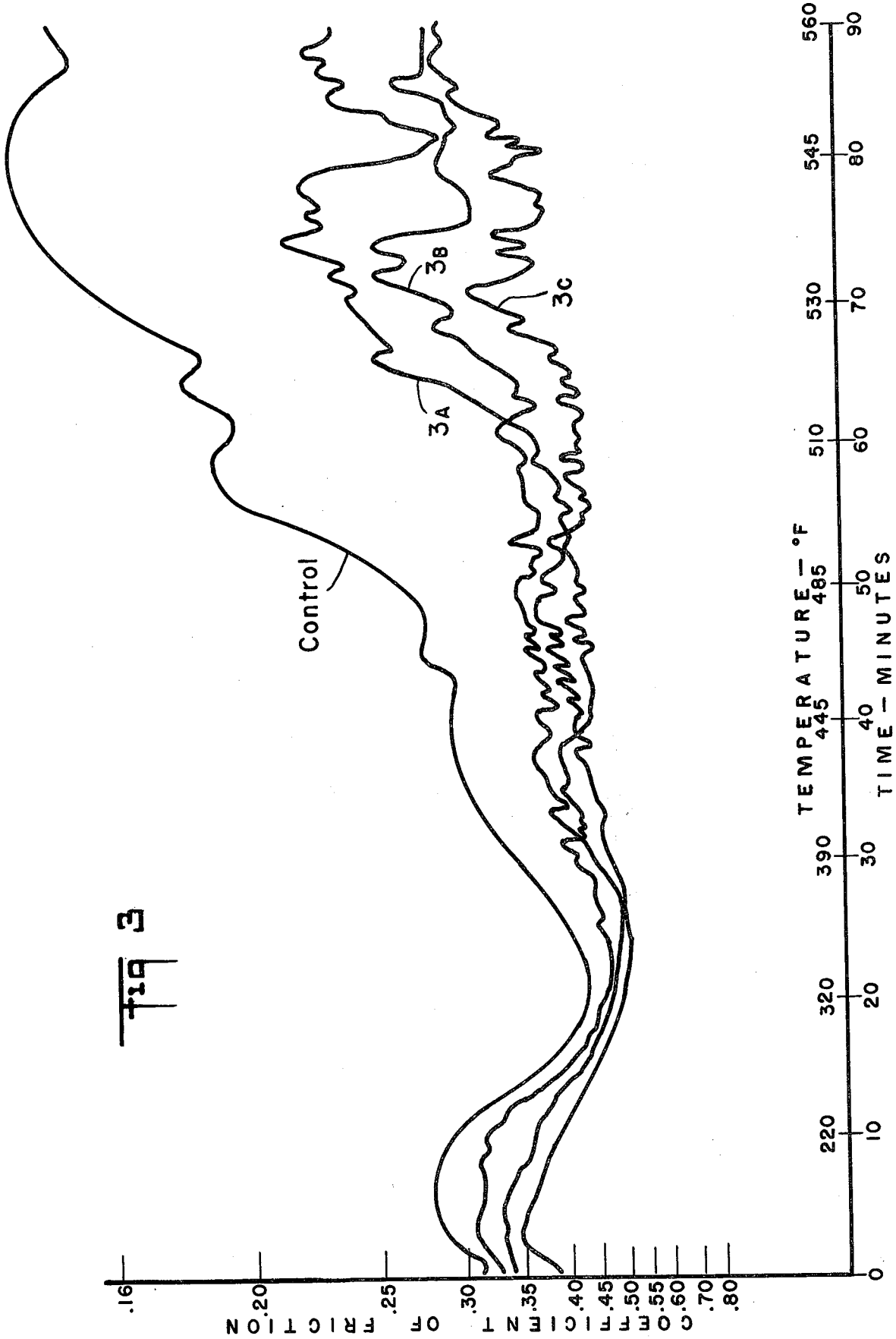

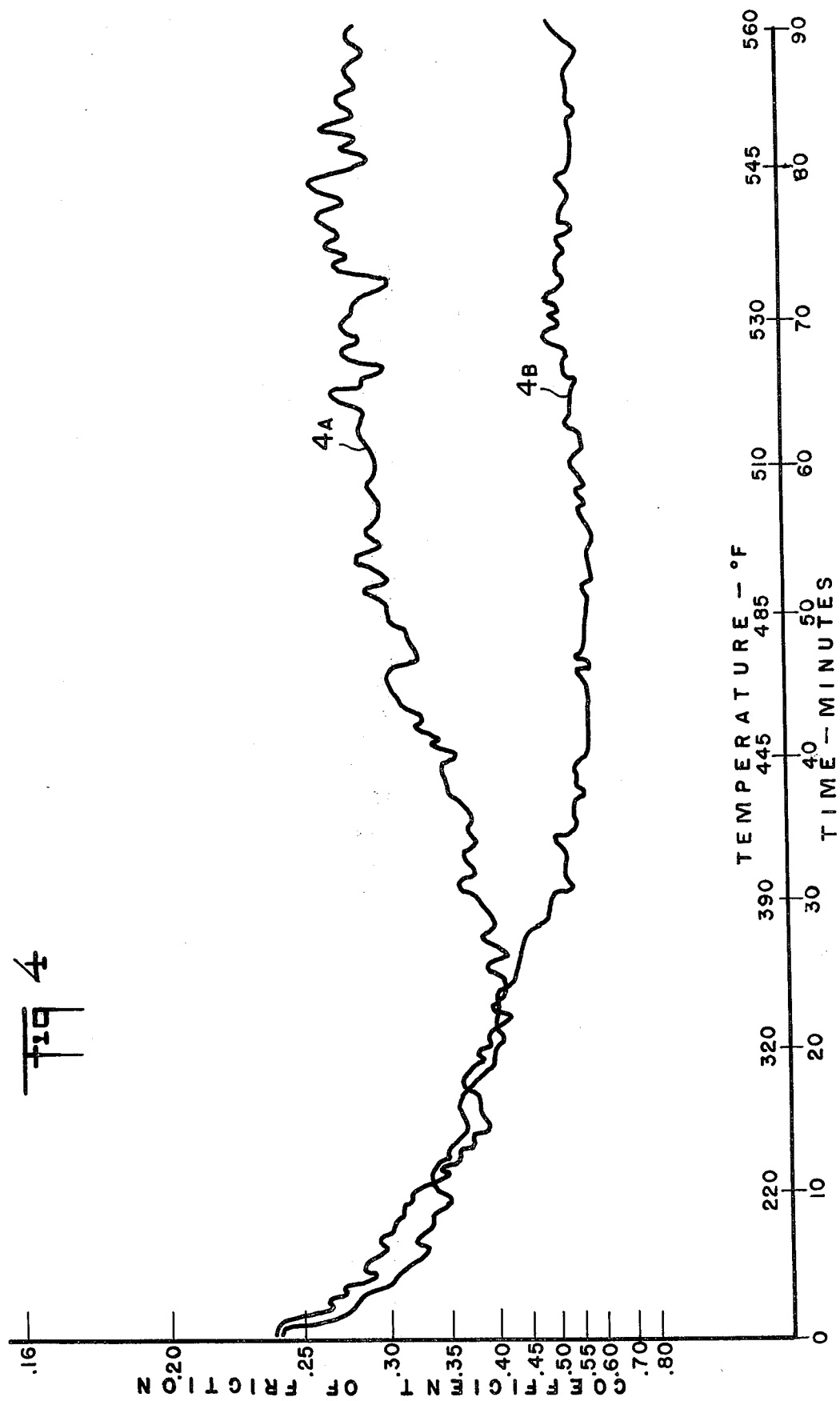

MOLECULAR SIEVES AS FADE INHIBITORS IN FRICTION MATERIALS

This application is a continuation-in-part of copending application Ser. No. 428,891 filed Dec. 27, 1973, which is a continuation of parent application Ser. No. 250,502 filed May 5, 1972 and now abandoned.

This invention relates to friction materials adapted to be used as automotive brake linings, and more particularly, to an improved brake lining or brake pad material which reduces brake "fade" and rubber banding.

The conventional brake lining materials employed in the automotive industry are based on asbestos and a thermosetting resin binder modified by any of various additives to provide and/or enhance specific desired properties. Typical brake lining compositions are described in detail in U.S. Pat. Nos. 3,227,249; 3,307,969; 3,492,262; 3,494,884; and 3,585,102.

The function of an automotive brake system is to convert the kinetic energy of a moving vehicle to heat, store the heat and eventually dissipate it to the atmosphere. When heat is generated faster than it can be dissipated, the temperature of the brake system rises, particularly at the sliding interface between the stator and rotor, e.g., between the brake lining and drum. This rise in temperature may reach a point at which components of the brake lining or pad decompose, oxidize or melt to produce a number of undesirable consequences, in particular brake "fade," rubber banding and excessive wear.

Brake "fade" may be defined as the loss of friction force output of a braking system with no change in the applied force. It has been postulated that brake fade is caused by evolution of gas at the sliding interface between the brake lining or pad and the brake drum or disc, respectively, thus reducing the coefficient of friction at the sliding surfaces. It is thought that the gas accumulates in small pockets and produces considerable pressure tending to separate the stator and rotor parts, thereby causing a decrease in the friction force which by definition is brake "fade."

Rubber banding is caused by transfer of heat-softened components of the pad or lining to the cooperating surface of the rotor. The transferred material forms blotches on the braking surface of the rotor which reduces the braking efficiency of the system.

It is an object of the present invention to provide a friction material adapted to be used as an automotive brake lining or pad and which when so used substantially reduces fade. It is another object of the invention to provide a friction material adapted to be used as an automotive brake lining or pad and which when so used reduces rubber banding. It is still another object of the invention to provide an automotive brake lining material having improved wearing qualities. Other objects of the invention will be in part obvious and in part pointed out hereafter.

This invention is predicated upon the discovery that the addition of a molecular sieve in its unloaded state to a conventional brake lining composition yields a product which exhibits superior resistance to fade and also reduces rubber banding. It appears that the molecular sieve adsorbs the gases generated during braking and emits these gases when the brakes are released.

Molecular sieves useful for the practice of this invention are those materials described generally as crystalline, metal aluminosilicates which in the dehydrated form have a stable three-dimensional network of $SiO_4$ and $AlO_4$ tetrahedra providing intra-crystalline voids which are interconnected by access openings or pores of uniform size. The electrovalence of the tetrahedra-containing aluminum is balanced by the inclusion in the crystal of a cation, in particular, alkali metal or alkaline earth metal cations, especially, sodium, potassium and calcium ions. The total void volume after dehydration is generally of the order of about 25–35%.

Molecular sieves suitable for use in accordance with the present invention are described in U.S. Pat. Nos. 2,882,243 and 2,868,244. These sieves are commercially available under the designations 3A, 4A, 5A, 10X and 13X having effective pore diameters of 3, 4, 5, 9 and 10 Angstroms, respectively. The molecular sieves are used in an unloaded state and in such an amount as to substantially increase the resistance of the brake lining or pad to fade. This amount is generally not in excess of 15% by weight and is preferably from 1% to 15% by weight of the brake lining material.

The compositions of the present invention, like those of the prior art, are based on asbestos and a thermosetting resin binder. The binder may, in general, be any of the thermosetting resins known to be useful in the production of brake lining materials, including, for example, urea-formaldehyde resins, cresol resins, phenol-formaldehyde resins, melamine formaldehyde resins, alkyds, polysiloxanes and epoxy resins. The phenol-formaldehyde resins are preferred.

The particular type of asbestos used is not critical. Among the types of asbestos that may be used are amosite, crocidolite, tremolite, chrysotile, and anthophyllite, with chrysotile being preferred.

In order to point out more fully the nature of the present invention, reference will now be made to the following Examples of illustrative friction compositions embodying the present invention and to the accompanying drawings which illustrate the results that were obtained when the exemplified compositions were tested. The data on which the graphs of the accompanying drawings are based were obtained by testing the exemplified compositions with a brake lining testing machine described in the Society of Automotive Engineers publication 670,079 by Anderson, Gratch and Hayes published Jan. 9–13, 1967, and entitled "A New Laboratory Friction and Wear Test for the Characterization of Brake Linings." This testing machine is characterized by the fact that it employs a constant rubbing velocity and with this constant rubbing velocity absorbs energy at a fixed rate by varying the pressure between the brake lining under test and the member upon which the brake lining rubs.

In each of FIGS. 1 to 4 the abscissae of the plotted curves are time and temperature, and the ordinates are the values of the coefficient of friction. It is evident that, in general, the temperature of each sample increased as a function of time and the coefficient of friction decreased, thus indicating the occurrence of fade. The curves of the several FIGURES of the drawings will be identified and described in connection with the corresponding formulations of the Examples.

EXAMPLE 1

A sample brake disc to be used as a control in a series of comparative tests was prepared as follows:

A Patterson-Kelly blender equipped with a whirling agitator was charged with the following ingredients in the proportions indicated in Table I, with the amounts of the ingredients being given in grams.

Table I

| | |
|---|---|
| Asbestos | 1058.8 |
| Phenolic Resin | 255.0 |
| Cashew particles | 235.20 |
| Rubber particles | 137.2 |
| Calcium aluminate | 39.2 |
| Zinc chips | 78.4 |
| Carbon black | 19.6 |
| Hexamethylene tetramine | 39.2 |
| Brass chips | 137.2 |

The blender was tumbled for 30 seconds and then the agitator was turned on and the mixer was run for an additional 4.5 minutes. The mixer was then discharged through the bottom opening into a container.

Samples in the form of disc brake pads were prepared by molding 185 grams of the above mixture at 1,200 p.s.i. with a 10-second dwell time in the mold. The sample was cured for 15 minutes at 4,000 p.s.i. with degassing at the end of one minute and at the end of 2.5 minutes. The resulting disc pads were then ejected from the mold and allowed to cool.

The edges of the samples were then trimmed to remove excess material and the samples were post-baked while under constraint in a forming container to prevent swelling for a period of 4.5 hours. The temperature was increased linearly over a period of 1½ hours to 450°F. and then held at 450°F. for the remaining 3 hours. The samples were allowed to cool to ambient temperature before being released from the constraining form.

EXAMPLE 2

The procedure of Example 1 was followed, except that the initial charge to the blender contained varying amounts of a 3A molecular sieve as indicated in Table II. In Table II the second column gives the nominal weight percent of the 3A molecular sieve used and the third column gives the actual weight in grams added to the blender.

Table II

| Sample No. | Nominal Wt. % | Actual Wt. in Grams |
|---|---|---|
| 1A | 1% | 19.6 |
| 1B | 3% | 58.7 |
| 1C | 5% | 98.8 |

Samples 1A, 1B and 1C, along with a control sample prepared as described in Example 1, were tested by the SAE Test identified above with the results illustrated in FIG. 1 of the drawings. As shown in FIG. 1, in the case of the control sample the measured coefficient of friction dropped to below the initial value at the end of about 40 minutes, whereas in the case of sample 1C the coefficient of friction did not drop below its initial value until the end of 70 minutes of the test, at which time the temperature was some 85°F. higher.

All of Samples 1A, 2A and 3A showed increased fade resistance as compared to the control sample for most of the period of the test.

EXAMPLE 3

The procedure of Example 1 was followed, except that the initial charge to the blender contained varying amounts of type 4A molecular sieve as indicated in Table III.

Table III

| Sample No. | Nominal Wt. % | Actual Wt. in Grams |
|---|---|---|
| 2A | 1% | 19.6 |
| 2B | 5% | 98.8 |
| 2C | 10% | 196 |

Samples 2A, 2B and 2C, together with a control sample prepared as in Example 1, were tested to determine their fade resistance with the results indicated in Curves 2A, 2B and 2C, respectively, of FIG. 2 of the drawings. As in the case of FIG. 1, FIG. 2 shows the substantial improvement in fade resistance obtainable by using a brake disc formulation containing a molecular sieve. In the case of Sample 2C the coefficient of friction at the end of the test was very nearly as large as the initial coefficient of friction at the beginning of the test.

EXAMPLE 4

The procedure of Example 1 was followed, except that the initial charge to the blender included varying amounts of a Type 13X molecular sieve as indicated in Table IV.

Table IV

| Sample No. | Nominal Wt. % | Actual Wt. in Grams |
|---|---|---|
| 3A | 3% | 58.7 |
| 3B | 5% | 98.8 |
| 3C | 10% | 196 |

Samples 3A, 3B and 3C, together with a control sample prepared as described in Example 1, were tested with the results indicated in Curves 3A, 3B and 3C, respectively, of FIG. 3 of the drawings. Here again all of Samples 3A, 3B and 3C incorporating the molecular sieve showed substantially greater fade resistance than the control sample.

EXAMPLE 5

A control sample 4A and a test sample 4B embodying the present invention were prepared by the general method of Example 1 but using the experimental formulation of Table V wherein the amounts of ingredients are given in grams.

Table V

| Ingredient | 4A | 4B |
|---|---|---|
| Phenolic resin | 400 | 400 |
| Asbestos | 1100 | 1100 |
| Barium Sulfate (Barytes) | 500 | 500 |
| 3A Molecular Sieve | | 200 |

The results of the tests on samples 4A and 4B are given in curves 4A and 4B, respectively, of FIG. 4 of the drawings and again show the substantial increase in fade resistance obtainable by incorporating a molecular sieve in the brake disc formulation.

It is, of course, to be understood that the foregoing description is intended to be illustrative only and that numerous changes can be made in the proportions, ingredients and conditions set forth without departing

I claim:

1. An automotive brake lining material comprising as its essential ingredients asbestos, a synthetic thermosetting resin and an unloaded molecular sieve in an amount to substantially increase the resistance of the brake lining material to fade.

2. The automotive brake lining material of claim 1 wherein the molecular sieve is present in an amount up to 15% by weight of said material.

3. The automotive brake lining material of claim 1 wherein the molecular sieve is present to the extent of 1% to 15% by weight of said material.

4. An automotive brake lining material comprising as its essential ingredients asbestos, a phenolic resin and an unloaded molecular sieve in an amount to substantially increase the resistance of the brake lining material to fade.

5. An automotive brake lining material comprising as its essential ingredients asbestos, a phenolic resin and an unloaded molecular sieve in an amount of 1% to 15% by weight of said material.

* * * * *